Sept. 6, 1932.　　F. W. JOHNSON　　1,875,612
WRECKING IMPLEMENT
Filed June 9, 1930
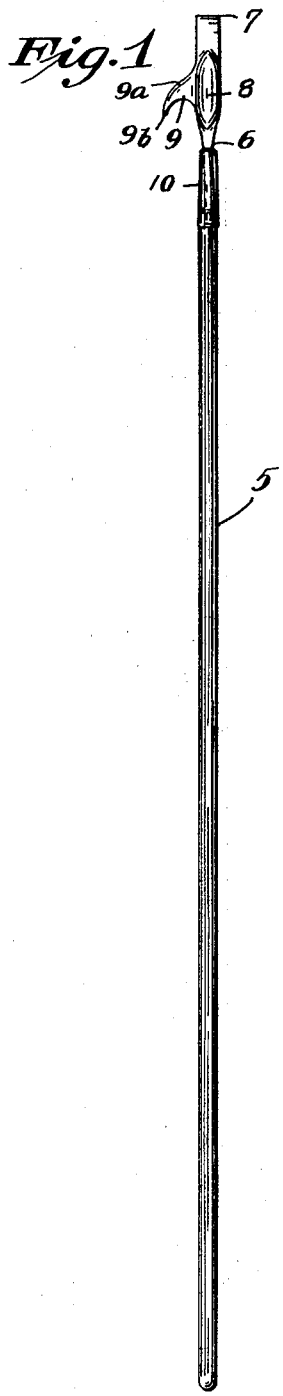
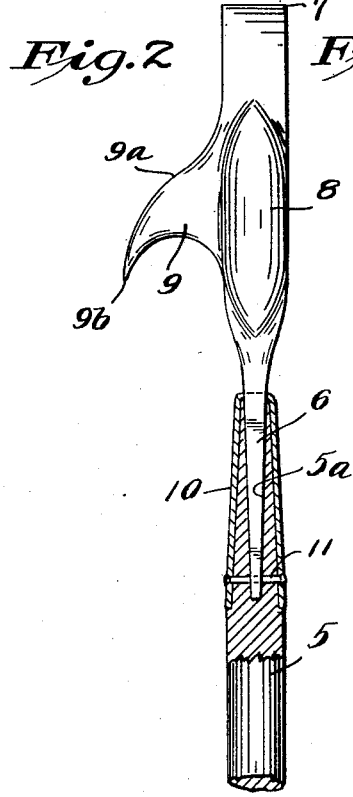
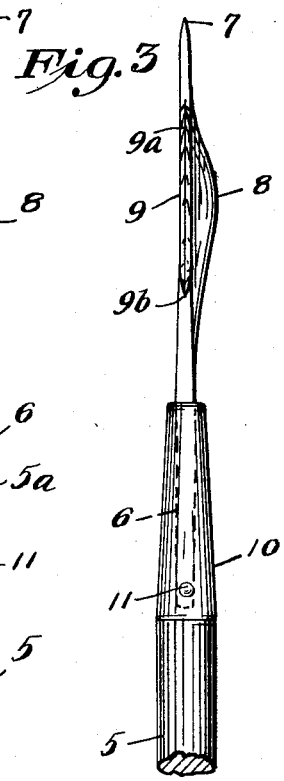
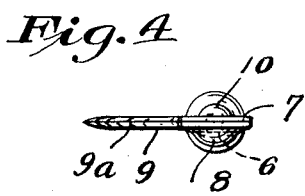
Inventor
Frederick W. Johnson
By his Attorneys
Williamson & Williamson Patented Sept. 6, 1932

1,875,612

UNITED STATES PATENT OFFICE

FREDERICK W. JOHNSON, OF EXCELSIOR, MINNESOTA, ASSIGNOR TO HENRY BEINERT, MASON E. MORSE, AND CLIFFORD D. BALLARD, OF EXCELSIOR, MINNESOTA

WRECKING IMPLEMENT

Application filed June 9, 1930. Serial No. 459,901.

This invention relates to wrecking poles or bars for wrecking and dismantling wooden buildings, frames, roofs and for tearing down or dismembering wooden and fibrous structures.

It is an object of my invention to provide a simple and highly efficient implement which will expedite and facilitate the wrecking and dismantling of the wooden and fibrous structures, such as the walls, ceilings and roofs of buildings.

My implement, while adapted for wide general use for wrecking purposes, is especially well adapted for use by firemen in penetrating walls and ceilings, dismembering roofs and shingles in gaining entrance through walls to fire or smoke.

More specifically it is an object of my invention to provide a wrecking implement in the form of an elongated pole having a thrust head provided with a chisel edge extremity for penetrating and splitting material and having a wedge portion and a hook portion which is adapted to be guided conveniently through material by the chisel edge and wedge portion and which will engage material after penetration has been effected.

These and other objects and advantages of the invention will be fully set forth in the following description made in connection with the accompanying drawing, in which like reference characters refer to similar parts throughout the several views, and in which:—

Fig. 1 is a side elevation of an embodiment of my wrecking implement;

Fig. 2 is a fragmentary side elevation of the head portion of the implement on a somewhat larger scale, a portion of the head-receiving socket of the handle being shown in cross section;

Fig. 3 is a side elevation of the implement turned 90 degrees from the position shown in Fig. 2, and Fig. 4 is a plan view of the operating end of the implement.

My implement includes an elongated straight handle or pole 5 having a shank-receiving socket 5a at the outer end thereof. A head preferably constructed of steel or other hard material, which will maintain an edge is secured to said socket and projects longitudinally of the handle 5, said head including a tapered shank 6 preferably of square cross section which is tightly fitted in socket 5a of the handle. The outer extremity of the head is of chisel shape terminating in a sharp edge 7. The intermediate portion of the head on one of its surfaces is provided with a re-enforcing and wedge rib 8 which tapers from its center to its ends, as clearly shown in Fig. 3. The head also includes a laterally projecting hook 9 which is of approximately the thickness of the chisel head and has an inclined edge 9a and terminates in a point 9b which projects in the direction of the handle.

A metal thimble 10 may surround the outer end of handle 5 protecting the socket and shank, and if desired, a pin or rivet 11 may be inserted diametrically through the handle, thimble and inner end of the shank to more positively secure the said parts together.

In operation the implement may be thrust longitudinally through a wall or ceiling, the chisel edge 7 easily splitting and penetrating the material and effecting an opening sufficient to readily accommodate the laterally projecting hook 9. The wedge action of the rib 8 assists in splitting or increasing the size of the opening and a powerful thrust may be obtained since the head extends longitudinally of the handle rather than laterally thereof.

In many instances after penetration is effected it is desirable to tear away or remove boards, shingles or other material and this may be readily done by turning the handle slightly to cause the point of the hook to engage material, and then pull or tear the same away from the building or structure. In removing shingles from a roof, it will readily be seen that the device may be thrust with the head disposed flat-wise beneath layers of shingles with a wedge action, tearing the shingles from the roof and material may be torn away by engaging the hook of the same and pulling the implement rearwardly.

When used by firemen the hook is also of advantage, enabling the fireman to grasp the peak of a roof or an over-hanging member to steady his foothold.

The device is equally applicable for stripping wainscoating, flooring, mouldings or mop-boards.

From the foregoing description it will be seen that I have provided a simple and highly efficient wrecking implement adapted to penetrate and dismember wooden and other fibrous structures.

It will, of course, be understood, that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:—

1. A wrecking implement comprising, a straight elongated handle, a thrust head secured to one end of said handle and extending longitudinally thereof, said head terminating in a chisel portion disposed longitudinally thereof, a wedging rib extending longitudinally of said head at the medial portion thereof and a hook extending laterally of said head and lying substantially in the same plane as said chisel portion, the point of said hook extending toward said handle.

2. The structure set forth in claim 1 wherein the outer edge defining said hook is inclined with respect to the adjacent longitudinal edge of said chisel portion.

3. A wrecking implement comprising an elongated substantially straight handle, a thrust head rigidly secured to one end of said handle and extending longitudinally thereof, said thrust head comprising a narrow bar terminating in a transverse splitting end of wedge shaped cross section and a hook extending laterally of said thrust head from the medial portion thereof and lying substantially in the same plane as said bar, said hook terminating in a point extending toward the handle.

4. The structure set forth in claim 3, wherein said hook is integrally formed with said thrust head and has an outer edge inclined with respect to the longitudinal edge of said thrust head.

5. A wrecking implement comprising a straight elongated handle, a thrust head rigidly secured to one end of said handle and extending longitudinally thereof, said thrust head comprising a narrow relatively thin bar flattened on at least one side and a hook extending laterally of said thrust head and lying in the same plane as said bar and integrally formed therewith, the outer edge of said hook being provided with a cutting edge extending at an angle to the longitudinal edge of said bar, said hook terminating in a point extending toward said handle.

In testimony whereof I affix my signature.

FREDERICK W. JOHNSON.